No. 648,640. Patented May 1, 1900.
J. STEINAKER.
HORSESHOE.
(Application filed Feb. 7, 1900.)
(No Model.)

Witnesses:
E. A. Volk.
F. F. Scherzinger.

Joseph Steinaker, Inventor
By Wilhelm Bonner
Attorneys.

UNITED STATES PATENT OFFICE.

JOSEPH STEINAKER, OF BUFFALO, NEW YORK.

HORSESHOE.

SPECIFICATION forming part of Letters Patent No. 648,640, dated May 1, 1900.

Application filed February 7, 1900. Serial No. 4,367. (No model.)

*To all whom it may concern:*

Be it known that I, JOSEPH STEINAKER, a citizen of the United States, residing at Buffalo, in the county of Erie and State of New York, have invented new and useful Improvements in Horseshoes, of which the following is a specification.

This invention relates to a non-slipping attachment for horseshoes, which is designed to be applied to the shoe in slippery weather and which can be readily removed when not required.

The principal object of my invention is to provide an inexpensive attachment of this kind which can be readily applied to an ordinary horseshoe and which is not liable to become loose.

The invention has the further object to improve the construction of the sharp auxiliary calks carried by the attachment.

Figure 1:
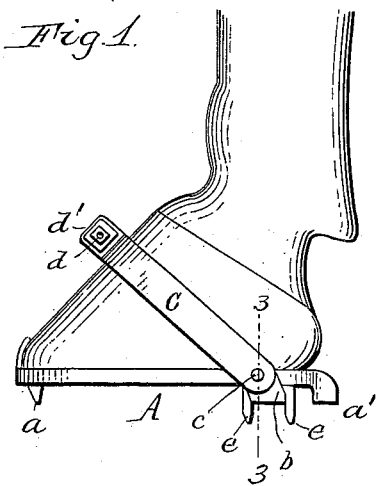
Figure 2:
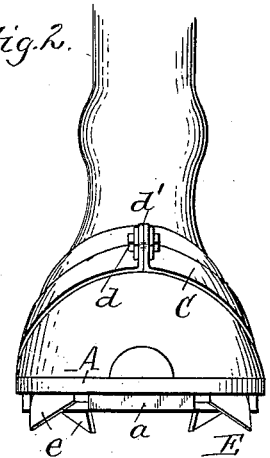
Figure 3:
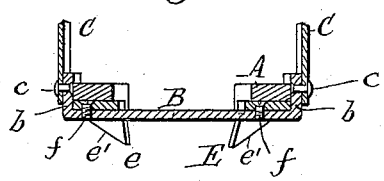
Figure 4:
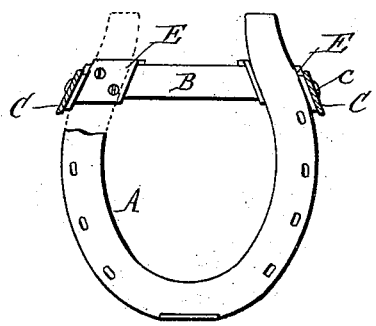
Figure 5:
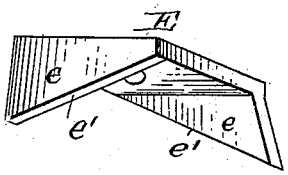

In the accompanying drawings, Figure 1 is a side elevation of my improved horseshoe attachment, showing the shoe applied to the horse's hoof. Fig. 2 is a front view thereof. Fig. 3 is a transverse section of the shoe and the non-slipping attachment in line 3 3, Fig. 1. Fig. 4 is a top plan view of the shoe with one leg thereof partly broken away to expose the adjacent sharp calk and showing the metallic fastening-straps in transverse section. Fig. 5 is an enlarged perspective view of one of the sharp auxiliary calks.

Like letters of reference refer to like parts in the several figures.

A is the body of an ordinary horseshoe, which is provided with the customary toe-calk $a$ and heel-calks $a'$ and which is secured to the horse's hoof in the usual manner.

B is a transverse yoke or cross-bar adapted to be applied to the lower rear portion of the horseshoe. This cross-bar bears against the flat under side of the horseshoe and is provided at its ends with upwardly-projecting lips $b$, which bear against the outer side of the horseshoe and which diverge forwardly to fit the corresponding diverging sides of the shoe, as shown in Figs. 3 and 4, thereby limiting the forward movement of the cross-bar on the shoe.

C represents metallic fastening-straps, which are attached at their lower ends to the end lips of the cross-bar B by horizontal pins or rivets $c$ and which extend forwardly and upwardly over the horse's hoof. The upper front ends of these straps are connected together by a transverse clamping-bolt $d$, which passes through perforated ears $d'$ of the straps. Upon tightening this bolt the straps are caused to firmly draw the cross-bar B upwardly and forwardly against the under side of the horseshoe. These straps thus prevent rearward and downward displacement of the cross-bar on the shoe, while the forwardly-diverging sides of the shoe, in conjunction with the end lips $b$ of the cross-bar, prevent forward displacement of the bar. If desired, this cross-bar may be removably secured to the horseshoe by any other suitable fastening.

E represents sharp auxiliary calks carried by the cross-bar B and projecting below the comparatively-dull heel-calks $a'$ of the shoe, so as to prevent the animal from slipping. These calks are arranged near the ends of the cross-bar, so as to stand in front of the ordinary dull heel-calks $a'$. Each of these auxiliary heel-calks preferably consists of a steel plate secured by one or more screws $f$ to the upper side of the cross-bar B and provided at its front and rear edges with depending spurs $e$, forming a double calk. These spurs bear against the front and rear edges of the cross-bar B and are preferably tapered or reduced in depth laterally and in opposite directions, or, in other words, the lower edges of the spurs are oblique, as shown at $e'$, and inclined in opposite directions, as shown in Figs. 2 and 5. By this construction the wide portion of each calk-spur stands opposite the narrow or vanishing portion of the other spur, and no snow or ice can therefore lodge or pack between the opposing calk-spurs. The horizontal connecting portions of the calk-spurs are arranged between the horseshoe-body A and the cross-bar B, as shown in Fig. 3, and the shoe thus acts as a lock, which prevents loosening of the fastening-screws of the calks.

When it is desired to use the ordinary horseshoe without the antislipping attachment, the latter can be readily detached upon removing the clamping-bolt $d$ from the metallic straps C.

The calks of the attachment can be readily removed for sharpening and renewing them.

I claim as my invention—

1. An antislipping attachment for horseshoes, consisting of a yoke or cross-bar provided with calks and adapted to be placed against the under side of a horseshoe and provided at its ends with upwardly-projecting lips arranged to bear against the forwardly-diverging sides of a horseshoe, and fastening-straps attached to the ends of said cross-bar and adapted to extend over the front side of the horse's hoof, substantially as set forth.

2. The combination with a horseshoe, of a yoke or cross-bar extending across the under side of the horseshoe near the rear end thereof, means for securing said yoke to the shoe, and a calk consisting of a horizontal plate interposed between the horseshoe and said yoke and provided with a depending spur, substantially as set forth.

3. A horseshoe-calk, consisting of a plate provided at its ends with depending spurs which are tapered or reduced in depth laterally and in opposite directions, whereby the wide portion of each spur stands opposite the narrow portion of the other spur, substantially as set forth.

4. A horseshoe-calk, consisting of a plate provided at its ends with depending spurs having oblique lower edges, the oblique edge of one spur being inclined in the opposite direction to the oblique edge of the other spur, substantially as set forth.

Witness my hand this 2d day of February, 1900.

JOSEPH STEINAKER.

Witnesses:
   CARL F. GEYER,
   CLAUDIA M. BENTLEY.